US007922567B2

(12) United States Patent
Gulak (10) Patent No.: US 7,922,567 B2
(45) Date of Patent: Apr. 12, 2011

(54) METHOD AND APPARATUS FOR SEPARATING MEAT FROM BONE

(75) Inventor: Kenneth Benjamin Gulak, Milton (CA)

(73) Assignee: Poss Design Limited (CA)

( * ) Notice: Subject to any disclaimer, the term of this patent is extended or adjusted under 35 U.S.C. 154(b) by 310 days.

(21) Appl. No.: 12/247,942

(22) Filed: Oct. 8, 2008

(65) Prior Publication Data
US 2010/0087129 A1 Apr. 8, 2010

(51) Int. Cl.
*A22C 17/00* (2006.01)
(52) U.S. Cl. ...................................................... 452/138
(58) Field of Classification Search .................. 452/106, 452/111–114, 120, 124, 138
See application file for complete search history.

(56) References Cited

U.S. PATENT DOCUMENTS

| 3,741,772 | A | * | 6/1973 | McFarland | 426/55 |
| 4,025,001 | A | * | 5/1977 | Yarem et al. | 241/24.16 |
| 4,042,176 | A | * | 8/1977 | Beck et al. | 241/24.16 |
| 4,215,450 | A | * | 8/1980 | Poss | 452/130 |
| 4,536,920 | A | * | 8/1985 | Amersfoort | 241/24.16 |
| RE32,060 | E | * | 12/1985 | McFarland | 426/55 |
| 4,558,490 | A | * | 12/1985 | Hazenbroek et al. | 452/165 |
| 5,154,663 | A | * | 10/1992 | Righele | 452/41 |
| 5,160,290 | A | * | 11/1992 | Richburg | 452/135 |
| 5,213,541 | A | * | 5/1993 | Richburg et al. | 452/135 |
| 5,306,202 | A | * | 4/1994 | Meeker | 452/138 |
| RE35,326 | E | * | 9/1996 | Richburg | 452/135 |

* cited by examiner

*Primary Examiner* — Thomas Price
(74) *Attorney, Agent, or Firm* — Steven M. Greenberg, Esq.; Carey Rodriguez Greenberg & Paul LLP (57) ABSTRACT

A separator apparatus that separates meat from bone in two distinct separation stages includes a rotary cam pump in series with a deboning screw assembly. In the first separation stage, substantially bone-free meat is separated from bone as the meat-bone mixture passes through the rotary cam pump, and expelled from the separator apparatus. The rotary cam pump then drives the remaining meat bone mixture into the deboning screw assembly, where a second separation stage occurs in which additional substantially bone-free meat is separated from bone as the meat-bone mixture passes through the deboning screw assembly, and is also expelled from the separator apparatus. The remaining bone residue is expelled from a bone residue outlet on the separator apparatus. The meat separated during the first stage can have a different coarseness than that separated during the second stage, and each can be expelled and collected at a different location.

18 Claims, 6 Drawing Sheets

METHOD AND APPARATUS FOR SEPARATING MEAT FROM BONE

CROSS-REFERENCE TO RELATED APPLICATIONS

This application claims priority under 35 U.S.C. §119(a) to Canadian Patent Application Serial Number 2640494, filed Oct. 6, 2008, entitled "Method and Apparatus for Separating Meat from Bone", the entirety of which is incorporated herein by reference.

FIELD OF INVENTION

The present invention relates to meat processing, and more particularly to machines used to separate meat from bone matter.

BACKGROUND OF THE INVENTION

Meat processing operations often produce, as a by-product, bones having small amounts of meat attached. While the amount of meat attached to any individual bone may be relatively small, in large meat processing operations the overall amount of meat that remains attached to the bones can be significant. Accordingly, it is desirable to recover this meat.

The process of reclaiming meat attached to leftover bones is generally referred to as mechanical separation, and the resulting product is generally described as mechanically separated meat. One concern associated with mechanically separated meat is that the separation process can shear off small pieces of bone. Even if there are no bone fragments large enough to pose a direct safety risk, incorporation of significant amounts of bone matter into the mechanically separated meat can result in unacceptably high levels of certain chemicals contained in the bones, such as calcium.

In addition, mechanically separated meat resulting from a mechanical separation process can be of various levels of quality. Generally, the meat resulting from mechanical separation is ground meat, and more coarsely ground meat is considered to be more valuable than more finely ground meat.

SUMMARY OF THE INVENTION

Aspects of the present invention are directed to apparatus and methods for separating meat from bone.

In one aspect, a first separation stage is carried out in which meat is separated from bone to become substantially bone-free meat as a meat-bone mixture passes through a rotary cam pump in a separator apparatus, and the substantially bone-free meat is expelled from the separator apparatus at a first location. The meat-bone mixture is moved to a deboning screw assembly in the separator apparatus where a second separation stage is carried out. During the second separation stage, additional meat is separated from bone to become additional substantially bone-free meat as the meat-bone mixture passes through the deboning screw assembly. The additional substantially bone-free meat is expelled at a second location.

The substantially bone-free meat expelled at the first location can have a different coarseness from the coarseness of the additional substantially bone-free meat expelled at the second location.

In one aspect, the present invention is directed to a separator apparatus for separating meat from bone matter. The separator apparatus comprises an input passage and a rotary cam pump. The rotary cam pump has a pump inlet in fluid communication with the input passage, at least one pump meat discharge port, and a pump outlet. The at least one pump meat discharge port is disposed on a flow path of the rotary cam pump between the pump inlet and the pump outlet, and has apertures defined therein to permit passage of meat therethrough and to inhibit passage of bone therethrough. The separator apparatus further comprises a deboning screw assembly. The deboning screw assembly comprises a screw assembly housing having a screw assembly inlet, a bone residue outlet, and a deboning region disposed between the screw assembly inlet and the bone residue outlet. The screw assembly inlet is in fluid communication with the pump outlet and is in further fluid communication with a deboning region inlet of the deboning region. The deboning region comprises a shroud and a deboning portion of a deboning screw, with the shroud surrounding the deboning portion of the deboning screw so that the deboning screw can rotate within the shroud. The shroud includes at least one screw assembly meat discharge port disposed radially adjacent the deboning portion of the deboning screw and having apertures defined therein to permit passage of meat therethrough and to inhibit passage of bone therethrough. The bone residue outlet is in fluid communication with a deboning region outlet of the deboning region. At least one drive member is operable to drive the rotary cam pump and to drive rotary movement of the screw. The separator apparatus is operable to receive a meat-bone mixture at the input passage and expel meat substantially free of bone matter from the at least one pump meat discharge port and the at least one screw assembly meat discharge port, and to expel bone residue from the bone residue outlet.

In one embodiment, the rotary cam pump comprises a rotor having an axis of rotation and a stator having an inner peripheral cam surface, an inlet side inner face in which the pump inlet is defined, and an outlet side inner face in which the pump outlet is defined. In this embodiment, the inlet side inner face and the outlet side inner face are substantially perpendicular to the axis of rotation of the rotor and substantially parallel to one another. Also in this embodiment, the rotor has a cam follower movably mounted thereto for following the inner peripheral cam surface of the stator and has an outer peripheral surface. The cam follower extends between and engages the inlet side inner face and the outlet side inner face. The outer peripheral surface of the rotor, the inner peripheral cam surface of the stator, the input side inner face and the output side inner face cooperate to define the flow path of the rotary cam pump so that the flow path constricts from the pump inlet to the pump outlet.

In a particular embodiment, the at least one pump meat discharge port comprises at least one perforated screen disposed in at least one of the inlet side inner face and the outlet side inner face. In a more particular embodiment, the at least one pump meat discharge port comprises an inlet side pump meat discharge port including an inlet side perforated screen disposed in the inlet side inner face and an outlet side pump meat discharge port including an outlet side perforated screen disposed in the outlet side inner face.

In one embodiment, the shroud comprises a hollow substantially cylindrical perforated screen so that substantially the entire shroud comprises the screw assembly meat discharge port.

In one embodiment, the deboning portion of the deboning screw has a screw root and at least one thread, and each thread engages an interior surface of the shroud, and the outer surface of the screw root is spaced from the interior surface of the shroud so that the radial distance between the outer surface of the screw root and the inner surface of the shroud is greater than a typical diameter of a largest type of bone in a meat-bone mixture in association with which the separator apparatus is to be used.

In one embodiment, the rotary cam pump is operable to supply a pressure increase to the meat-bone mixture.

In one embodiment, the shroud is substantially cylindrical, and the deboning portion of the deboning screw has a screw root and at least one thread, and each thread has a substantially constant outer diameter so that each thread engages an interior surface of the shroud, and the outer surface of the screw root is spaced from the interior surface of the shroud and the screw root has a diameter which increases from the deboning region inlet toward the deboning region outlet.

In other aspects, the present invention is directed to methods of using the above-described apparatus to separate meat from bone.

BRIEF DESCRIPTION OF THE DRAWINGS

These and other features of the invention will become more apparent from the following description in which reference is made to the appended drawings wherein.

DETAILED DESCRIPTION

A separator apparatus according to an aspect of the present invention may be used for separating meat from bone matter, for such meats as pork, beef, veal, bison, venison, mutton, lamb, as well as poultry meats such as chicken and turkey, and other suitable food animals not listed herein. It will be appreciated that the bones of various animals used for meat will differ in size and shape, and that a separator apparatus according to an aspect of the present invention should be constructed so that it is suitably sized for the type of animal whose meat it will process, and in particular for the size of bone (or bone pieces) that will be included in the meat-bone mixture. Thus, a separator apparatus to be used for processing a beef meat-bone mixture will typically be larger than a separator apparatus to be used for processing a pork bone mixture, for example. For illustrative purposes, aspects of the present invention, including certain exemplary dimensions, are described in the context of a separator apparatus for use in processing a pork meat-bone mixture. As noted above, separators according to aspects of the present invention are not limited to use with pork, and may, with suitable dimensional modification, be used with other types of meat-bone mixture.

Figure 1:
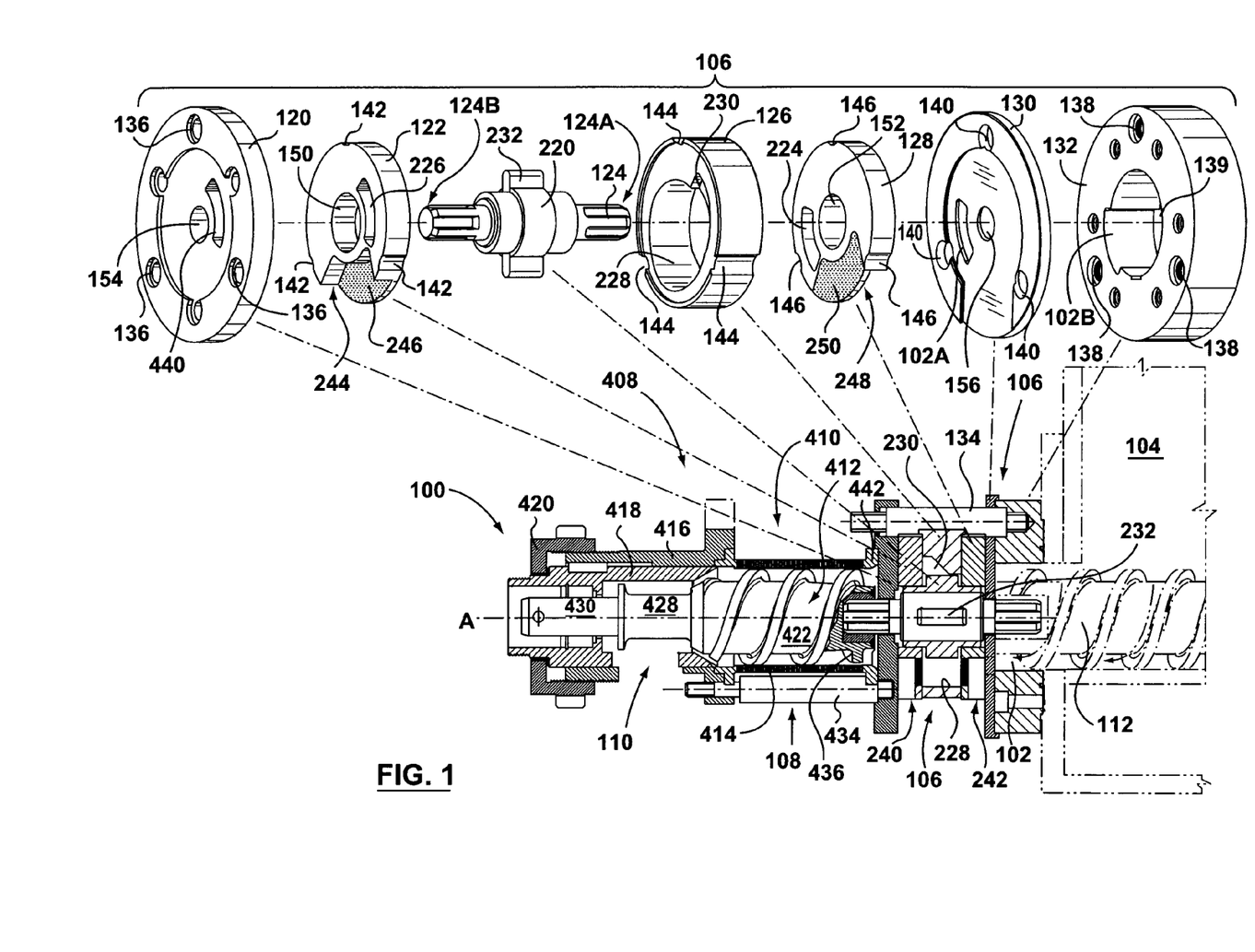
FIG. 1 is a side cross-sectional view of an embodiment of a separator apparatus according to an aspect of the present invention, including an exploded perspective view of a rotary cam pump according to an aspect of the present invention.
Figure 2A:
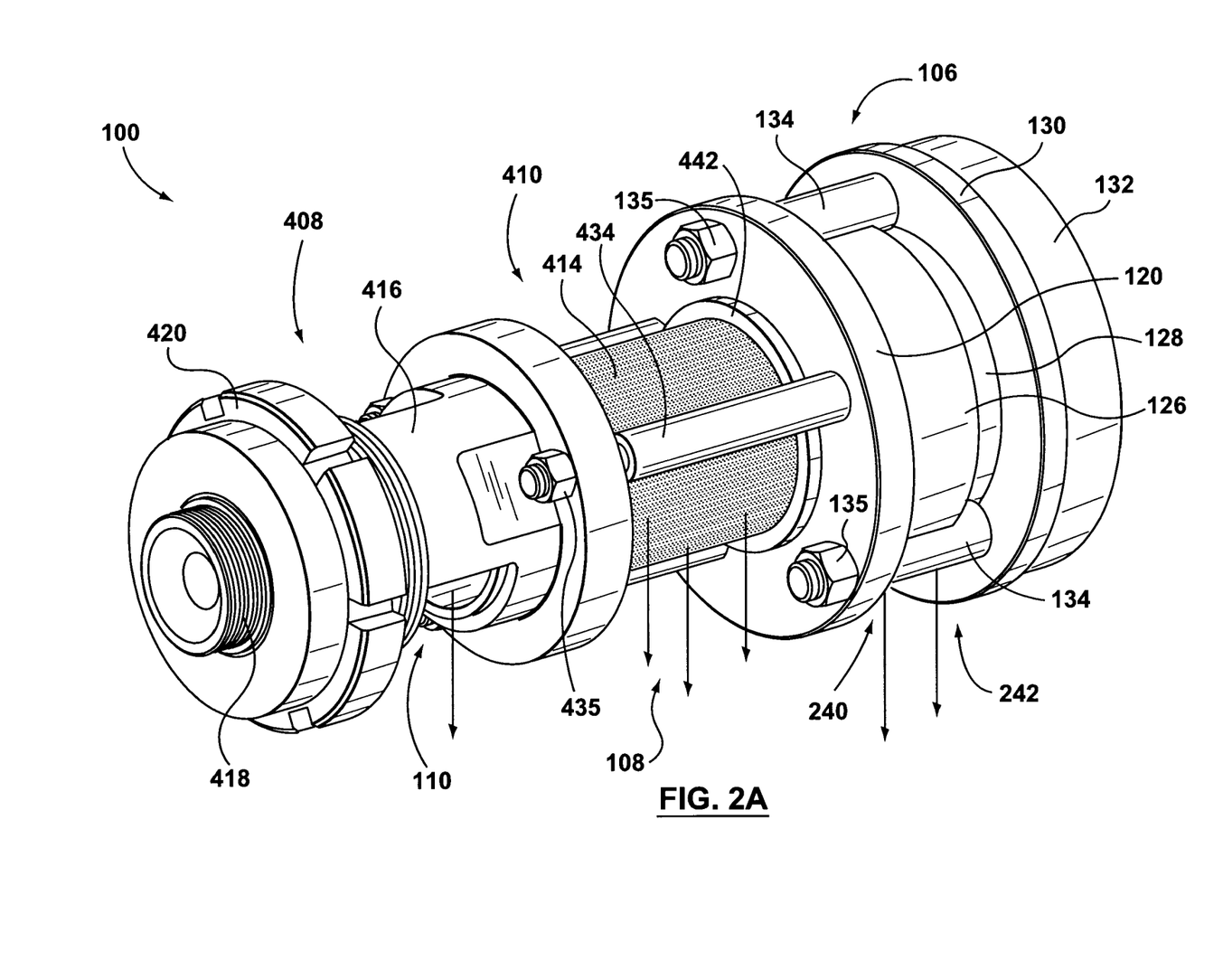
FIG. 2A is a perspective view of the separator apparatus of FIG. 1.
Figure 2B:
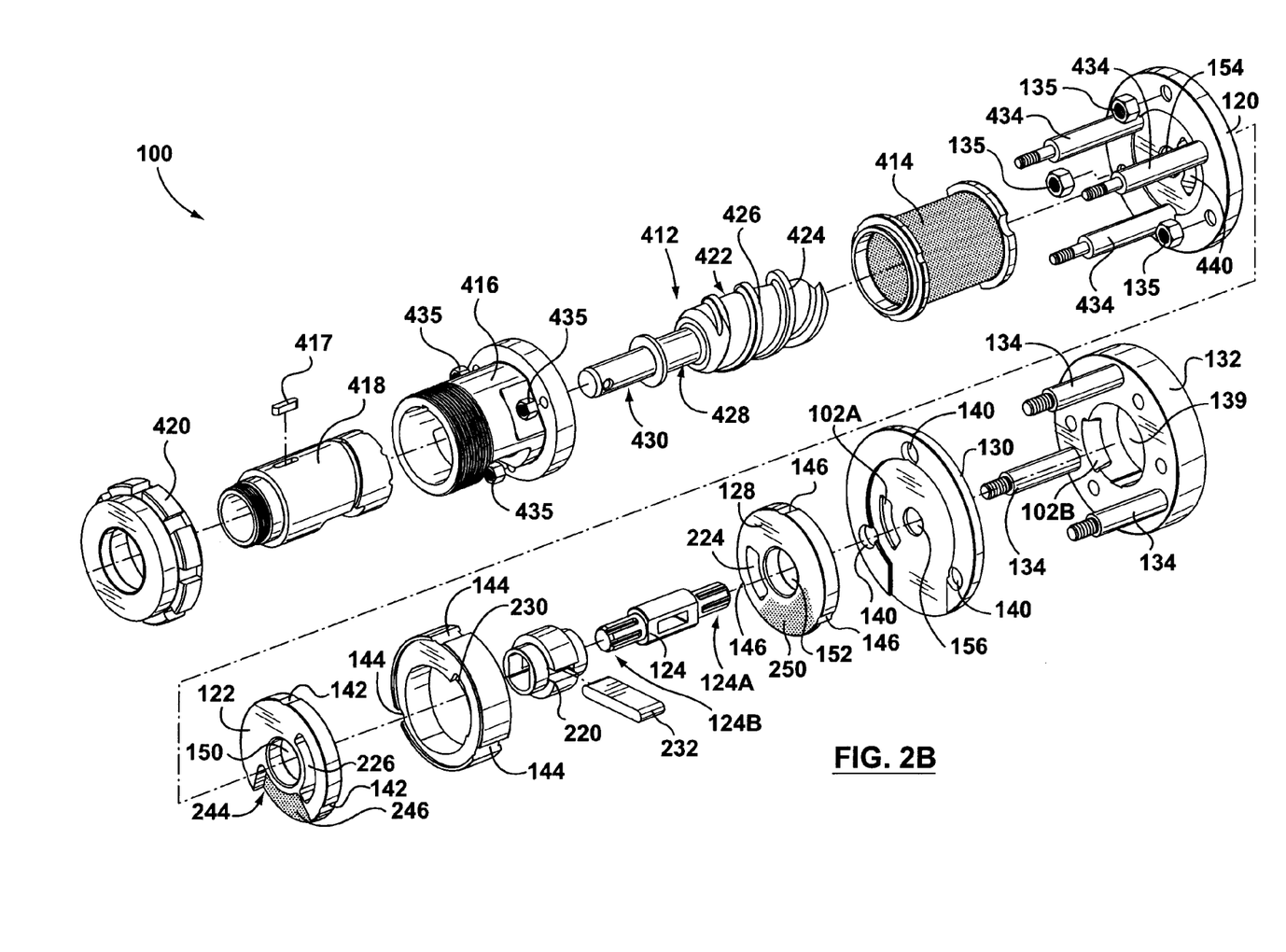
FIG. 2B is an exploded perspective view of the separator apparatus of FIG. 1.

With reference now to FIGS. 1, 2A and 2B, an exemplary separator apparatus is shown generally at 100. The separator apparatus 100 may be used for separating pork meat from bone matter. In particular, a suitable input for the separator apparatus 100 would be a mixture of button bones, pin bones, and chime bones, each having meat attached thereto, that is, a meat-bone mixture, and the output of the separator apparatus 100 would be ground pork that is substantially free of bone matter, as well as bone residue comprising bones having some, but substantially less, meat attached thereto. The separator apparatus 100 is designed to facilitate keeping the bone residue substantially separate from the ground meat, as will be described in greater detail below.

The separator apparatus 100 comprises an input passage 102 for receiving a meat-bone mixture, such as from a hopper 104 (shown with dotted lines), a rotary cam pump 106, a deboning screw assembly 108 including a bone residue outlet 110, and at least one drive member 112. The drive member may comprise, for example, an input screw used to push meat-bone mixture from the hopper 104 into the input passage 102 and thus toward and into the rotary cam pump 106.

The separator apparatus 100 separates meat from bone in two distinct separation stages. In a first separation stage, meat is separated from bone as the meat-bone mixture passes through the rotary cam pump 106, and the resulting substantially bone-free meat is expelled from the separator apparatus 100 (for example, to be collected in a container). The rotary cam pump 106 then drives the meat-bone mixture (which contains less meat, since some meat was isolated from the meat-bone mixture and expelled by the rotary cam pump 106 during the first separation stage) into the deboning screw assembly 108, which carries out a second separation stage. During the second separation stage, additional meat is separated from bone as the meat-bone mixture passes through the deboning screw assembly, and this additional substantially bone-free meat is also expelled from the separator apparatus 100. The remnants of the meat bone mixture, that is, the bone residue (which may include some meat) remaining after the two separation stages, are then expelled from the bone residue outlet 110. In the embodiment shown, the meat separated during the first separation stage is expelled from the separator apparatus 100 at a location different from that for the meat separated during the second separation stage, which permits the meat separated at the first separation stage to have a different coarseness from that separated at the second separation stage, and for the meat separated at each stage to be kept apart (i.e. collected in separate containers).

In the exemplary embodiment 100 shown in FIGS. 1, 2A and 2B, the rotary cam pump 106 comprises an assembly of several components, including an intermediate plate 120, a pump outlet plate 122, a pump spline 124, a pump cam plate 126, a pump inlet plate 128, a pump housing plate 130, and an adaptor plate 132, which are secured together by way of pump assembly tie bars 134 and pump assembly bolts 135. As can be seen, the intermediate plate 120 and the adaptor plate 132 each have three holes 136, 138, respectively, defined therethrough for receiving the ends of the pump assembly tie bars 134. Similarly, the pump outlet plate 122, pump cam plate 126, pump inlet plate 128 and pump housing plate 130 each have respective recesses 142, 144, 146, 140 defined in their outer surfaces to mate with the pump assembly tie bars 134. Part of the input passage 102 is defined by an aperture 102A through the pump housing plate 130, and part of the input passage 102 is defined by a recessed region 102B on the adaptor plate 132, which collectively permit fluid communication (i.e. passage of meat-bone mixture) from the hopper 104 to the rotary cam pump 106.

Figure 3A:
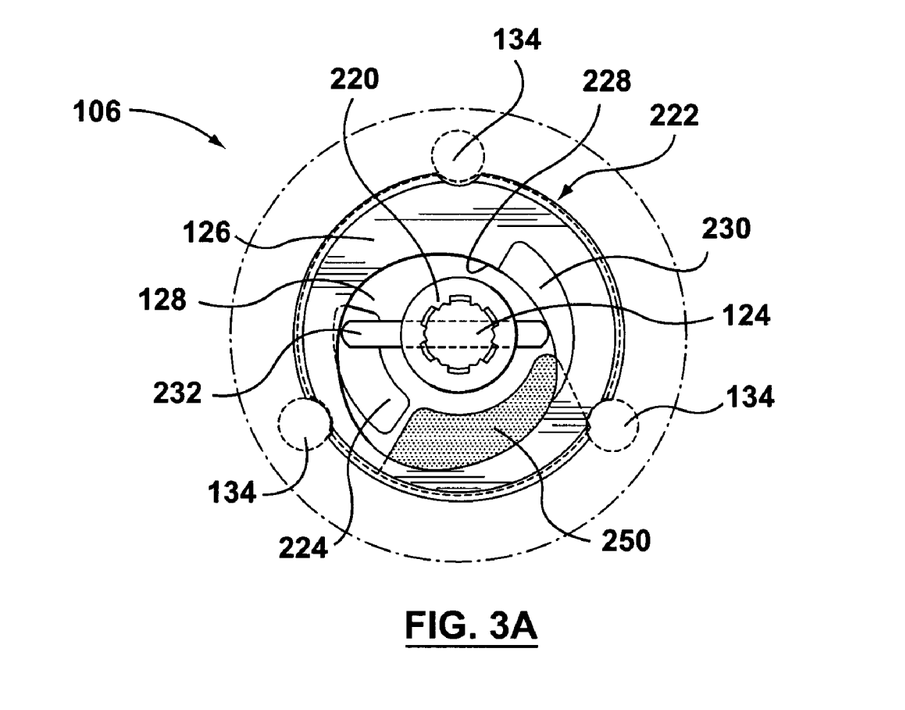
FIG. 3A is a cut-away view of the rotary cam pump shown in exploded perspective view in FIG. 1, with its rotor in a first position.
Figure 3B:
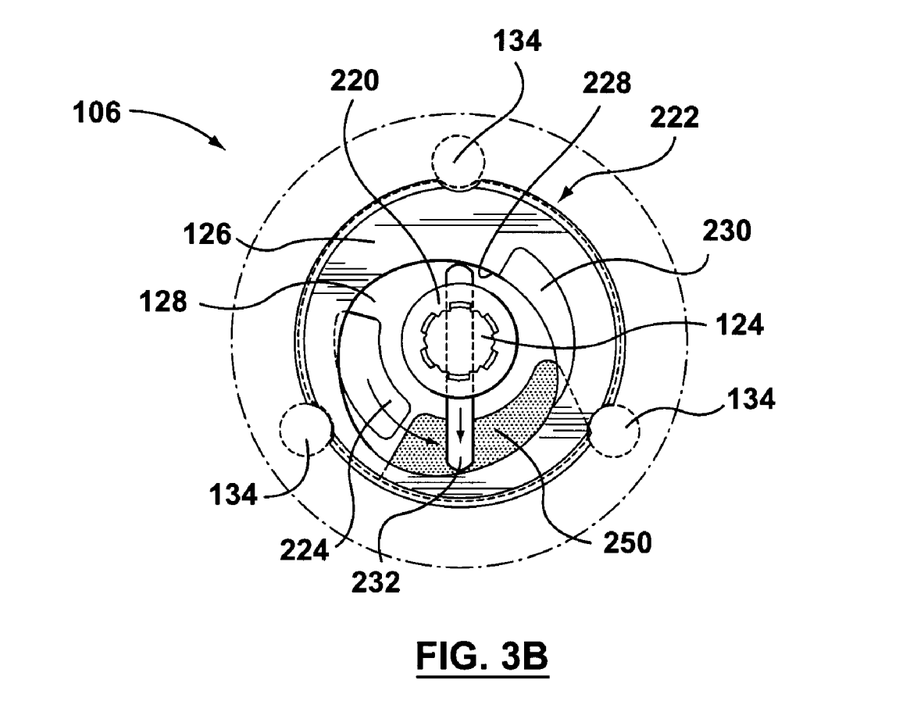
FIG. 3B is a cut-away view of the rotary cam pump shown in exploded perspective view in FIG. 1, with its rotor in a second position.

The rotary cam pump 106 comprises a rotor 220 having an axis of rotation (axis "A" in FIG. 1) and a stator 222 (see FIGS. 3A and 3B). The stator 220 defines an interior volume of the rotary cam pump 106, and comprises the pump outlet plate 122, pump cam plate 126 and pump inlet plate 128. The rotor 220 is non-rotatably carried by the pump spline 124, and is rotatably journalled in the respective central apertures 150, 152 of the pump outlet plate 122 and the pump inlet plate 128. As indicated in FIGS. 1 and 2B, the pump spline 124 extends through the central apertures 154, 156 of the intermediate plate 120 and the pump housing plate 130, respectively. Thus, a first end 124A of the pump spline 124 can be non-rotatably received within an end of the input screw 112, and a second end 124B of the pump spline 124 can be non-rotatably received by the deboning screw 412 (described below). This enables a single motive source to drive rotation of the input screw 112, the rotor 220 and the deboning screw 412.

The rotary cam pump 106 has a pump inlet 224 in fluid communication with the input passage 102. The pump inlet 224 is defined through the pump inlet plate 128, allowing a flow of meat-bone mixture to pass into the interior volume of the stator 222. More particularly, the meat bone mixture is driven from the hopper 104 into and through the input passage 102 and into the pump inlet 224 by the input screw 112.

A pump outlet 226 is defined through the pump outlet plate 122, allowing meat-bone mixture to exit the interior volume of the stator 222. The pump cam plate 126, and hence the stator 222, has an inner peripheral cam surface 228, which cooperates with the inner face of the pump inlet plate 128 (including the pump inlet 224), the inner face of the pump outlet plate 122 (including the pump outlet 226) and the outer peripheral surface of the rotor 220 to define a curved flow path from the pump inlet 224 through the stator 222 into the pump outlet 226. The pump outlet plate 122 and pump inlet plate 128, and hence the inlet side inner face and the outlet side inner face, are each substantially perpendicular to the axis "A" representing the axis of rotation of the rotor 220, and hence parallel to one another. A relief region 230 is defined in the outlet side of the pump cam plate 126 and is aligned with the pump outlet 226 defined in the pump outlet plate 122 so as to permit fluid communication between the interior volume of the stator 222 and the pump outlet 226.

Reference is now made to FIGS. 3A and 3B, which show a cut-away view of part of the rotary cam pump 106. Specifically, FIGS. 3A and 3B show a view along the axis "A", looking toward the hopper 104, with the entire deboning screw assembly 108, as well as the intermediate plate 120 and pump outlet plate 122, removed so that the interior of the rotary cam pump 106 is visible. Thus, in FIGS. 3A and 3B the pump spline 124, the rotor 220, the pump cam plate 126 and part of the pump inlet plate 128, are visible. FIG. 3A shows the rotor 220 and cam follower 232 (described below) in a first position, and FIG. 3B shows the rotor 220 and cam follower 232 in a second position representing a 90 degree anticlockwise rotation from the position shown in FIG. 3A. Because the rotor 220 and cam follower 232 (although not the stator 222) are symmetrical in the illustrated embodiment, a further 90 degree anticlockwise rotation of the rotor 220 would place the rotor 220 and cam follower 232 in a position equivalent to that shown in FIG. 3A.

As can be seen in FIGS. 3A and 3B, the inner peripheral cam surface 228 of the pump cam plate 126 is non-circular and eccentric relative to the axis "A" of the rotor 220, so that the flow path constricts from the pump inlet 224 through the stator 222 into the pump outlet 226. More particularly, while the inner face of the pump inlet plate 128 and the inner face of the pump outlet plate 122 (not shown in FIGS. 3A and 3B) are parallel to one another and hence equidistant from one another along the length of curved the flow path, the distance between the inner peripheral cam surface 228 and the outer peripheral surface of the rotor 220 progressively decreases along the flow path from the pump inlet 224 to the pump outlet 226. In the illustrated embodiment, the cam surface is eccentric from the axis "A" by approximately 1¼ inches.

The rotor 220 has a cam follower 232 movably mounted thereto for following the inner peripheral cam surface 228 of the stator 222; the cam follower has rounded ends to facilitate this. In the particular embodiment illustrated, the cam follower 232 is slidably received in the rotor 220, and passes through a complementary aperture in the pump spline 124. The cam follower 232 serves as a vane for sweeping meat-bone mixture along the flow path from the pump inlet 224 toward the pump outlet 226, and as such extends between and engages the inner faces of the pump outlet plate 122 (not shown in FIGS. 3A and 3B) and the pump inlet plate 128. As used herein, the term "engages", although not necessarily requiring actual physical contact, denotes an extremely close, flush fit between two components, in this case the cam follower 232 and the inner faces of the pump outlet plate 122 (not shown in FIGS. 3A and 3B) and pump inlet plate 128. The term "engages", so defined, is also used elsewhere herein. In an exemplary embodiment, each side of the cam follower 232 is flat and is about four thousandths of an inch from the respective inner faces of the pump outlet plate 122 and pump inlet plate 128.

As a flow of meat-bone mixture enters the interior volume of the stator 222 via the pump inlet 224, further forward motion (i.e. parallel to the axis "A" in FIG. 1) is arrested by the inner face of the pump outlet plate 122 (not shown in FIGS. 3A and 3B). As the cam follower 232 sweeps along the inner peripheral cam surface 228, it pushes the meat-bone mixture along the curved flow path between the inner peripheral cam surface 228 and the outer peripheral surface of the rotor 220, toward the recessed portion 230 and thus into the pump outlet 226 (not shown in FIGS. 3A and 3B). The action of the cam follower 232 in pushing the meat-bone mixture along the flow path from the pump inlet 224 toward the pump outlet 226, coupled with the fact that the flow path constricts from the pump inlet 224 to the pump outlet 226, serves to increase the pressure to which the meat-bone mixture is subject as it moves through the rotary cam pump 106.

Referring briefly to FIGS. 1 and 2B, an outlet side pump meat discharge port 240 and an inlet side meat discharge port 242 are disposed in the stator 222 on the flow path, between the pump inlet 224 and the pump outlet 226. In the particular embodiment shown, the pump outlet plate 122 has a recessed lower portion 244 co-located with a perforated screen 246 in its inner face, and the pump inlet plate 128 similarly has a recessed lower portion 248 co-located with a perforated screen 250 in its inner face. The screens 246, 250 and recessed lower portions 244, 248 are positioned so that when the pump outlet plate 122, pump cam plate 126 and pump inlet plate 128 are assembled to form the stator 222, the screens 246, 250 and the recessed lower portions 244, 248 are located on the flow path, between the pump inlet 224 and the pump outlet 226. The recessed lower portion 244 and perforated screen 246 on the pump outlet plate 122 cooperate with the intermediate plate 120 to define the outlet side pump meat discharge port 240, and the recessed lower portion 248 and screen 250 on the pump inlet plate 128 cooperate with the pump housing plate 130 to define the inlet side pump meat discharge port 242. In one embodiment, the screens 246, 250 have circular perforations approximately 3.5 millimeters in diameter. Other sizes of screen may also be used. It will be appreciated that the perforated screens used, and the size of perforations therein, should be selected to permit passage of meat therethrough and to inhibit passage of bone therethrough.

In operation, and with reference now to FIGS. 1, 2B, 3A and 3B, a meat-bone mixture contained in the hopper 104 is pushed (such as by an input screw 112) from the hopper 104, through the input passage 102 and through the pump inlet 224 into the interior volume of the stator 222. As it enters the interior volume of the stator 222, the meat-bone mixture is swept along the curved flow path by the cam follower 232 carried by the rotor 220, resulting in an increase in pressure. As the meat-bone mixture moves along the flow path, meat is forced through the apertures in the screens 246, 250 and thus into the pump meat discharge ports 240, 242, from which the meat can fall by gravity into, for example, a waiting container. In the illustrated embodiment, because the perforations in the screens 246, 250 are approximately 3.5 millimeters in diameter, the meat emerging from the meat discharge ports 240, 242 will be correspondingly course. Without being limited by theory, it is believed that meat passes through the perforations in the screens 246, 250 because the pressure increase along the flow path in the stator 222 forces meat through the perforations. As such, it is believed that scraping of the bones against the perforations in the screens 246, 250, and resulting undesirable contamination of the meat product with bone matter, is limited. Accordingly, the close, flush fit between the cam follower 232 and the inner faces of the pump outlet plate 122 and pump inlet plate 128, and hence the perforated screens 246, 250, assists in sweeping bone and cartilage past and away from the screens 246, 250. The remaining meat-bone mixture continues along the flow path toward the recessed portion 230 and into the pump outlet 226, and then through the pump outlet 226 toward the deboning screw assembly 108. Construction and operation of the deboning screw assembly 108 will now be described.

With reference now to FIGS. 2A, 2B, 4 and 5, the deboning screw assembly 108 comprises a screw assembly housing 408 having a deboning screw 412 rotatably disposed therewithin. In the illustrated embodiment, the screw assembly housing 408 comprises, in addition to the deboning screw 412, a shroud in the form of a hollow cylindrical perforated screen 414, a front flange 416, a restrictor 418, and an end cap 420. The deboning screw 412 comprises a deboning portion 422 having one or more threads 424 helically arranged on a screw root 426, a bone residue discharge portion 428, and a journaling portion 430. The end 436 of the deboning screw 412 adjacent the deboning portion 422 non-rotatably receives the pump spline 124, so that rotation of the pump spline 124 will cause rotation of the deboning screw 412. The cylindrical perforated screen 414 surrounds the deboning portion 422 of the deboning screw 412, so that the cylindrical perforated screen 414 and deboning portion 422 collectively define a deboning region 410 of the deboning screw assembly. The cylindrical perforated screen 414 is secured between the intermediate plate 120 and the front flange 416 by way of screw assembly tie rods 434 and screw assembly bolts 435, which secure the front flange 416 to the intermediate plate 120. Thus, the cylindrical perforated screen 414 is captured between the intermediate plate 120 and the front flange 416.

The restrictor 418 is received within the front flange 416 and secured thereto by the end cap 420, and is non-rotatably locked, relative to the front flange 416, by a key 417. The journaling portion 430 of the deboning screw 412 is journalled in the restrictor 418. The restrictor 418 and front flange 416 have respective aligned apertures, which collectively define the bone residue outlet 110.

Both ends of the cylindrical perforated screen 414 are open, and thus the end 442 of the cylindrical perforated screen 414 that is adjacent the intermediate plate 120 defines a screw assembly inlet 444 into the deboning region 410 that is in fluid communication with the pump outlet 226 by way of a passageway 440 in the intermediate plate 120. The passageway 440 is aligned with the pump outlet 226. Thus, as the deboning screw 412 rotates, the threads 424 move the meat-bone mixture along the deboning region 410 from the screw assembly inlet 444 (where the meat-bone mixture is received via the passageway 440 from the rotary cam pump 106) toward the bone residue outlet 110. Because the meat-bone mixture is under pressure as a result of the action of the rotary cam pump 106, as the meat-bone mixture moves along the deboning region 410, meat is forced against the interior surface of the perforated screen so that substantially bone-free meat emerges through the apertures of the cylindrical perforated screen 414. Thus, the entire cylindrical perforated screen 414 serves as a single, cylindrical, screw assembly meat discharge port that is radially adjacent the deboning portion 422 of the deboning screw 412. In the embodiment shown, the apertures in the cylindrical perforated screen 414 are approximately 1 millimeter in diameter, and counterbores approximately 2 millimeters in diameter are disposed on the outside of the cylindrical perforated screen 414, coaxially with each (approximately) 1 millimeter aperture and extending into the material of the cylindrical perforated screen 414 by an amount equal to about two thirds of its thickness. Without being limited by theory, it is believed that the counterbores improve meat texture and reduce temperature increases in the cylindrical perforated screen 414. In the illustrated embodiment, because the perforations in the cylindrical perforated screen 414 are approximately 1 millimeter in diameter, the meat emerging therefrom will have a corresponding coarseness. Thus, meat emerging from the screw assembly meat discharge port(s) will be less coarse than meat emerging from the pump meat discharge port(s).

Figure 4:
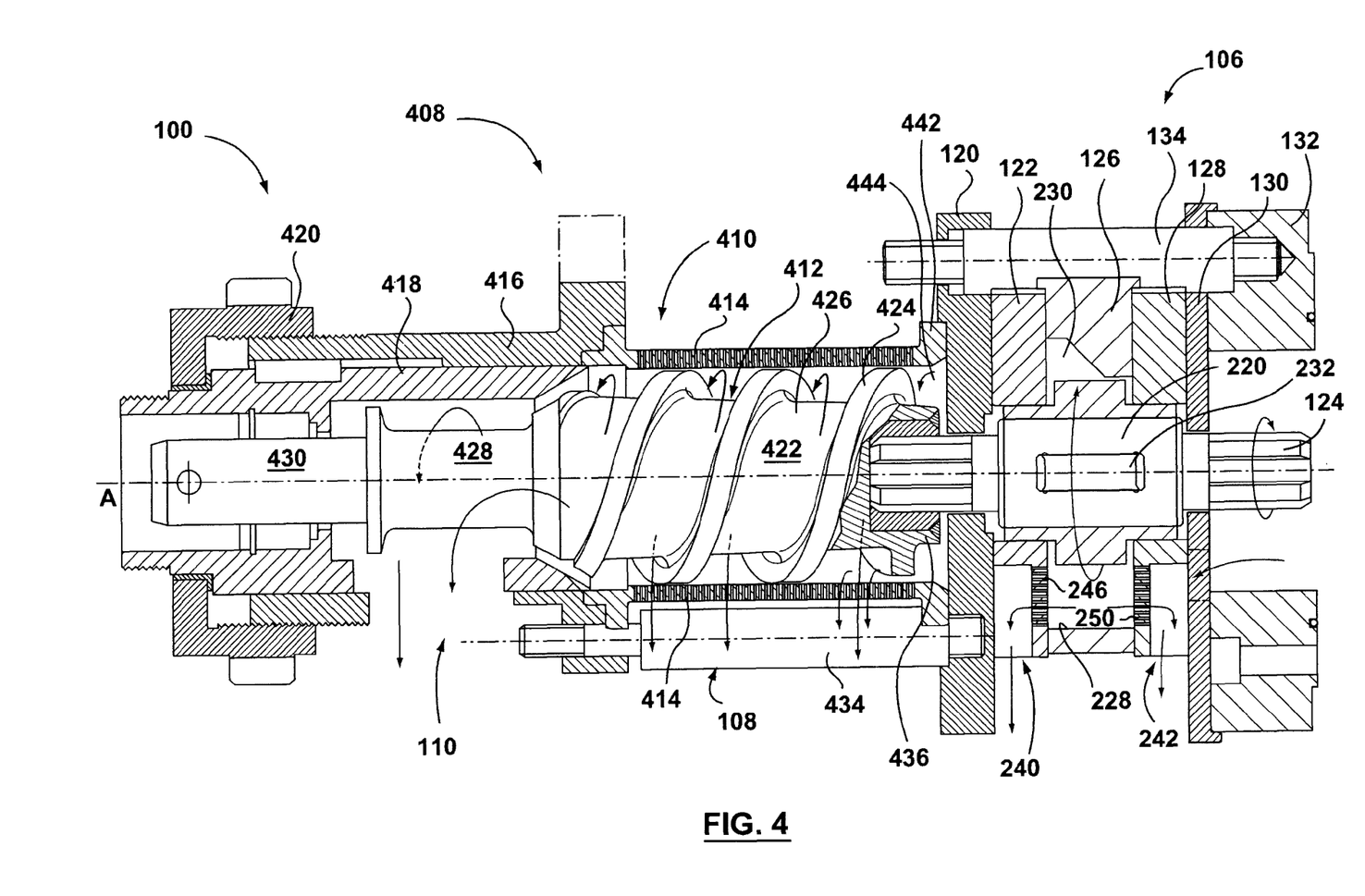
FIG. 4 is more detailed side cross-sectional view of the separator apparatus of FIG. 1.
Figure 5:
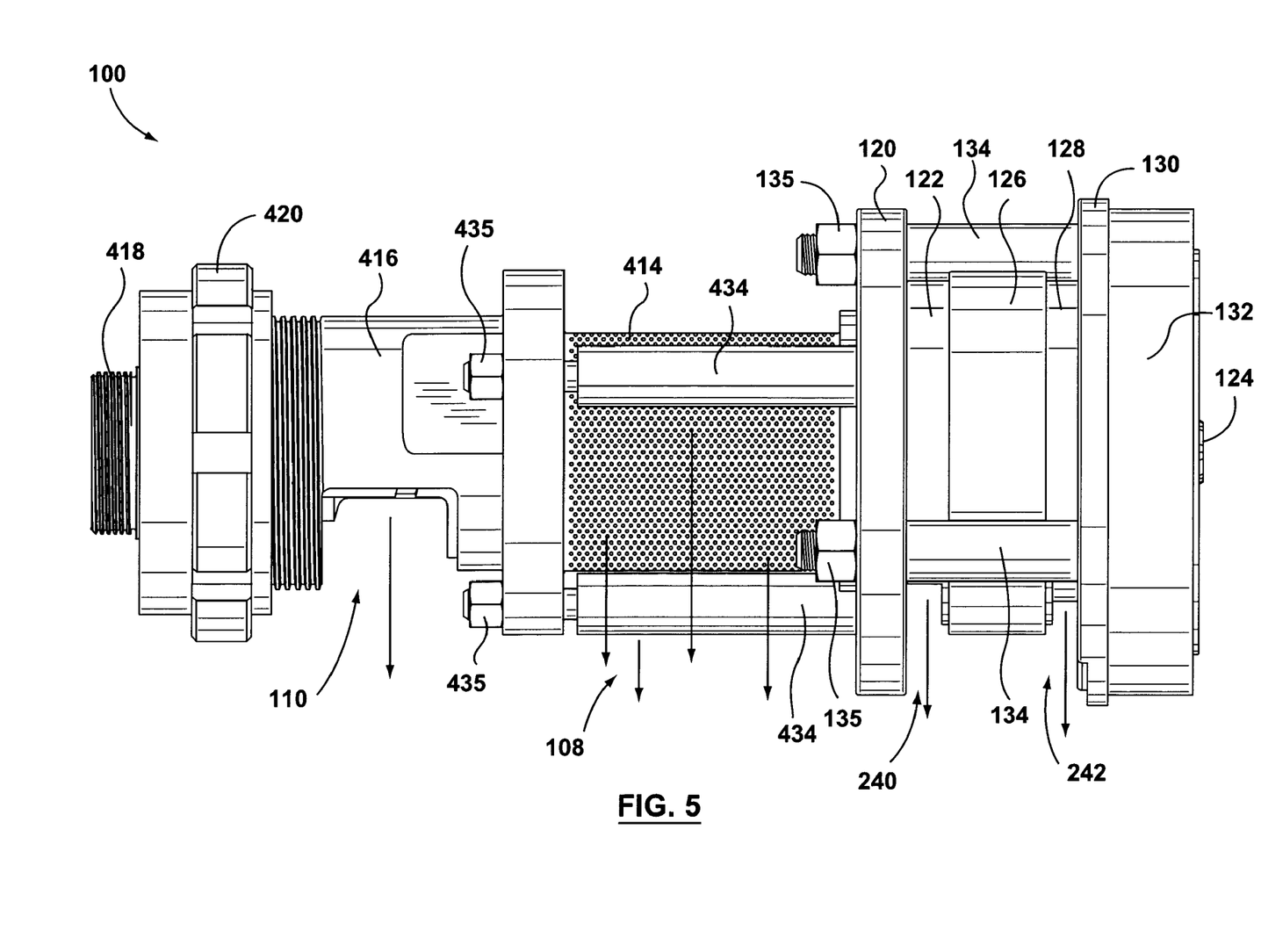
FIG. 5 is a side view of the separator apparatus of FIG. 1.

As can be seen in FIG. 4, the diameter of the root 426 of the deboning portion 422 of the deboning screw 412 is not constant, but increases gradually from the end 436, where the diameter of the root 426 is smallest, to the transition from the deboning portion 422 to the bone residue discharge portion 428, where the diameter of the screw root 426 is greatest. Thus, the screw root 426 has a diameter that increases from the deboning region inlet toward the deboning region outlet. Without being limited by theory, it is believed that this increase in diameter may assist in maintaining the pressure of the meat-bone mixture by reducing the available volume to compensate for the fact that some of the meat in the meat-bone mixture has exited the deboning region 410 via the cylindrical perforated screen 414. Bone residue, that is, the remnants of the meat-bone mixture that reach the bone residue discharge portion 428 of the deboning screw 412, exit the screw assembly 408 by way of the bone residue outlet 110.

In the embodiment shown, the deboning portion 422 of the deboning screw 412 includes two individual threads 424, also known as a "double flight". Each thread 424 on the deboning portion 422 of the deboning screw 412 engages (as defined above) the interior surface of the cylindrical perforated screen 414, and the outer surface of the screw root 426 is spaced from the interior surface of the cylindrical perforated screen 414. In particular, the parameters of the deboning portion 422 of the deboning screw 412 are selected so that the radial distance between the outer surface of the screw root 426 and the inner surface of the cylindrical perforated screen 414 is greater than the typical diameter of the largest type of bone in the meat-bone for which the separator apparatus 100 is to be used. For example, the radial distance may be selected to be larger than the $95^{th}$ or $99^{th}$ percentile size of the largest type of bone. Without being limited by theory, it is believed that the aforesaid structure inhibits bone pieces from being caught between the outer surface of the screw root 426 and the inner surface of the of the cylindrical perforated screen 414, thereby providing a radial distance that is generally sufficient to allow the bone piece to deflect away from the interior surface of the cylindrical perforated screen 414 rather than being ground against the apertures in the cylindrical perforated screen 414 by rotation of the deboning portion 422 of the deboning screw 412. It is further believed that this inhibits small bone fragments from being ground away from the bones and exiting the deboning region 410 by way of the apertures in the perforated screen 422.

In the embodiment shown, which, as indicated above, may be used to separate pork meat from bone matter, and may receive a meat-bone mixture of button bones, pin bones, and chime bones, each having meat attached, the following screw dimensions have been found to be advantageous. The screw root 426 has a diameter of approximately 2.5 inches at the screw assembly inlet end 436, and a diameter of approximately 3.5 inches at the transition to the bone residue outlet portion 428. In addition, the screw root 426 has a region of constant approximately 3.5 inch diameter in the 2-inch region immediately preceding the transition to the bone residue outlet portion 428. The outer diameter of the threads 424 (measured from thread to thread, perpendicular to axis "A" in FIG. 1) remains substantially constant from end to end at approximately 5 inches. Thus, at the screw assembly inlet end 436, the diameter of the screw root 426 is approximately 2.5 inches less than the outer diameter of the threads 424, and at the transition to the bone residue outlet portion 428, the diameter of the screw root 426 is approximately 1.5 inches less than the outer diameter of the threads 424.

In the illustrated embodiment, a single drive member drives the entire separator apparatus 100. In particular, an input screw 112 used to push meat-bone mixture from the hopper 104 into the input passage 102 may be drivingly coupled to both the rotor 220 and the deboning screw 412 by way of pump spline 124. In alternate embodiments (not shown), distinct drive members may be used to drive the rotary cam pump and the deboning screw.

It will be appreciated that while an exemplary embodiment has been described herein as having two opposed pump meat discharge ports, it is within the contemplation of the inventor that only a single pump meat discharge port may be used. For example, the outlet side pump meat discharge port 240 may be omitted, or the inlet side pump meat discharge port 242 may be omitted, without departing from the scope of the present invention.

Also, in the exemplary embodiment the shroud is in the form of a substantially cylindrical perforated screen 414, so that the entire cylindrical perforated screen 414 serves as a single, cylindrical, screw assembly meat discharge port. Alternatively, one or more individual screw assembly meat discharge ports (e.g. individual perforated screens) may be disposed at one or more locations about the shroud, so that the shroud may have one or a plurality of separate screw assembly meat discharge ports.

In addition, while the exemplary deboning portion 422 of the deboning screw 412 has been described herein as having a "double flight" of two helical threads 426, in other embodiments a single thread, or more than two threads, may also be used.

One or more currently preferred embodiments have been described by way of example. It will be apparent to persons skilled in the art that a number of variations and modifications can be made without departing from the scope of the invention as defined in the claims.

What is claimed is:

1. A separator apparatus for separating meat from bone matter, comprising:
   an input passage;
   a rotary cam pump, the rotary cam pump having a pump inlet in fluid communication with the input passage, at least one pump meat discharge port, and a pump outlet, the at least one pump meat discharge port being disposed on a flow path of the rotary cam pump between the pump inlet and the pump outlet, the at least one pump meat discharge port having apertures defined therein to permit passage of meat therethrough and to inhibit passage of bone therethrough;
   a deboning screw assembly, the deboning screw assembly comprising a screw assembly housing having a screw assembly inlet, a bone residue outlet, and a deboning region disposed between the screw assembly inlet and the bone residue outlet, wherein:
      the screw assembly inlet is in fluid communication with the pump outlet and is in further fluid communication with a deboning region inlet of the deboning region;
      the deboning region comprises a shroud and a deboning portion of a deboning screw, with the shroud surrounding the deboning portion of the deboning screw so that the deboning screw can rotate within the shroud, the shroud including at least one screw assembly meat discharge port disposed radially adjacent the deboning portion of the deboning screw, the at least one screw assembly meat discharge port having apertures defined therein to permit passage of meat therethrough and to inhibit passage of bone therethrough; and
      the bone residue outlet is in fluid communication with a deboning region outlet of the deboning region; and
   at least one drive member operable to drive the rotary cam pump and to drive rotary movement of the screw;
   wherein the separator apparatus is operable to receive a meat-bone mixture at the input passage and expel meat substantially free of bone matter from the at least one pump meat discharge port and the at least one screw assembly meat discharge port, and to expel bone residue from the bone residue outlet.

2. The separator apparatus of claim 1, wherein the rotary cam pump comprises a rotor having an axis of rotation and a stator, and wherein:
   the stator has an inner peripheral cam surface, an inlet side inner face in which the pump inlet is defined, and an outlet side inner face in which the pump outlet is defined, the inlet side inner face and the outlet side inner face being substantially perpendicular to the axis of rotation of the rotor and substantially parallel to one another;
   the rotor has a cam follower movably mounted thereto for following the inner peripheral cam surface of the stator and has an outer peripheral surface, the cam follower extending between and engaging the inlet side inner face and the outlet side inner face;
   the outer peripheral surface of the rotor, the inner peripheral cam surface of the stator, the input side inner face and the output side inner face cooperating to define the flow path of the rotary cam pump so that the flow path constricts from the pump inlet to the pump outlet.

3. The separator apparatus of claim 2, wherein the at least one pump meat discharge port comprises at least one perforated screen disposed in at least one of the inlet side inner face and the outlet side inner face.

4. The separator apparatus of claim 3, wherein the at least one pump meat discharge port comprises an inlet side pump meat discharge port including an inlet side perforated screen disposed in the inlet side inner face and an outlet side pump meat discharge port including an outlet side perforated screen disposed in the outlet side inner face.

5. The separator apparatus of claim 1, wherein the shroud comprises a hollow substantially cylindrical perforated screen so that substantially the entire shroud comprises the screw assembly meat discharge port.

6. The separator apparatus of claim 5, wherein the deboning portion of the deboning screw has a screw root and at least one thread, and wherein each thread engages an interior surface of the shroud, and wherein an outer surface of the screw root is spaced from the interior surface of the shroud so that the radial distance between the outer surface of the screw root and the inner surface of the shroud is greater than a typical diameter of a largest type of bone in a meat-bone mixture in association with which the separator apparatus is to be used.

7. The separator apparatus of claim 1, wherein the deboning portion of the deboning screw has a screw root and at least one thread, and wherein each thread engages an interior surface of the shroud, and wherein an outer surface of the screw root is spaced from the interior surface of the shroud so that the radial distance between the outer surface of the screw root and the inner surface of the shroud is greater than a typical diameter of a largest type of bone in a meat-bone mixture in association with which the separator apparatus is to be used.

8. The separator apparatus of claim 1, wherein the rotary cam pump is operable to supply a pressure increase to the meat-bone mixture.

9. The separator apparatus of claim 1, wherein the shroud is substantially cylindrical, and wherein the deboning portion of the deboning screw has a screw root and at least one thread, and wherein each thread has a substantially constant outer diameter so that each thread engages an interior surface of the shroud, and wherein an outer surface of the screw root is spaced from the interior surface of the shroud and the screw root has a diameter which increases from the deboning region inlet toward the deboning region outlet.

10. A method of separating meat from bone, the method comprising:
    passing a meat-bone mixture through an input passage to a rotary cam pump, the rotary cam pump having a pump inlet in fluid communication with the input passage, at least one pump meat discharge port, and a pump outlet, the at least one pump meat discharge port being disposed on a flow path of the rotary cam pump between the pump inlet and the pump outlet, the at least one pump meat discharge port having apertures defined therein to permit passage of meat therethrough and to inhibit passage of bone therethrough, so that meat substantially free of bone matter exits the rotary cam pump via the at least one pump meat discharge port and a reduced meat-bone mixture exits the pump outlet;
    passing the reduced meat-bone mixture to a deboning screw assembly, the deboning screw assembly comprising a screw assembly housing having a screw assembly inlet, a bone residue outlet, and a deboning region disposed between the screw assembly inlet and the bone residue outlet, wherein:
        the screw assembly inlet is in fluid communication with the pump outlet and is in further fluid communication with a deboning region inlet of the deboning region;
        the deboning region comprises a shroud and a deboning portion of a deboning screw, with the shroud surrounding the deboning portion of the deboning screw so that the deboning screw can rotate within the shroud, the shroud including at least one screw assembly meat discharge port being disposed radially adjacent the deboning portion of the deboning screw, the at least one screw assembly meat discharge port having apertures defined therein to permit passage of meat therethrough and to inhibit passage of bone therethrough; and
        the bone residue outlet is in fluid communication with a deboning region outlet of the deboning region;
    so that meat substantially free of bone matter exits the deboning screw assembly via the at least one screw assembly meat discharge port and bone residue exits the deboning screw assembly via the bone residue outlet.

11. The method of claim 10, wherein the rotary cam pump comprises a rotor having an axis of rotation and a stator, and wherein:
    the stator has an inner peripheral cam surface, an inlet side inner face in which the pump inlet is defined, and an outlet side inner face in which the pump outlet is defined, the inlet side inner face and the outlet side inner face being substantially perpendicular to the axis of rotation of the rotor;
    the rotor has a cam follower movably mounted thereto for following the inner peripheral cam surface of the stator and has an outer peripheral surface, the cam follower extending between and engaging the inlet side inner face and the outlet side inner face;
    the outer peripheral surface of the rotor, the inner peripheral cam surface of the stator, the input side inner face and the output side inner face cooperating to define the flow path of the rotary cam pump so that the flow path constricts from the pump inlet to the pump outlet.

12. The method of claim 11, wherein the at least one pump meat discharge port comprises at least one perforated screen disposed in at least one of the inlet side inner face and the outlet side inner face.

13. The method of claim 12, wherein the at least one pump meat discharge port comprises an inlet side pump meat discharge port including an inlet side perforated screen disposed in the inlet side inner face and an outlet side pump meat discharge port including an outlet side perforated screen disposed in the outlet side inner face.

14. The method of claim 10, wherein the shroud comprises a hollow substantially cylindrical perforated screen so that substantially the entire shroud comprises the screw assembly meat discharge port.

15. The method of claim 14, wherein the deboning portion of the deboning screw has a screw root and at least one thread, and wherein each thread engages an interior surface of the shroud, and wherein an outer surface of the screw root is spaced from the interior surface of the shroud so that the radial distance between the outer surface of the screw root and the inner surface of the shroud is greater than a typical diameter of a largest type of bone the meat-bone mixture.

16. The method of claim 10, wherein the deboning portion of the deboning screw has a screw root and at least one thread, and wherein each thread engages an interior surface of the shroud, and wherein an outer surface of the screw root is spaced from the interior surface of the shroud so that the radial distance between the outer surface of the screw root and the inner surface of the shroud is greater than a typical diameter of a largest type of bone in a meat-bone mixture in association with which the separator apparatus is to be used.

17. The method of claim 10, wherein the rotary cam pump is operable to supply a pressure increase to the meat-bone mixture.

18. The method of claim 10, wherein the shroud is substantially cylindrical, and wherein the deboning portion of the deboning screw has a screw root and at least one thread, and wherein each thread has a substantially constant outer diameter so that each thread engages an interior surface of the shroud, and wherein an outer surface of the screw root is spaced from the interior surface of the shroud and the screw root has a diameter which increases from the deboning region inlet toward the deboning region outlet.

* * * * *